United States Patent
Ma et al.

(10) Patent No.: US 12,506,551 B2
(45) Date of Patent: Dec. 23, 2025

(54) TECHNIQUES FOR CROSS LINK INTERFERENCE REPORTING IN WIRELESS COMMUNICATIONS

(71) Applicant: QUALCOMM Incorporated, San Diego, CA (US)

(72) Inventors: Ruifeng Ma, Beijing (CN); Chenxi Hao, Beijing (CN); Huilin Xu, Temecula, CA (US); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 18/011,050

(22) PCT Filed: Jul. 31, 2020

(86) PCT No.: PCT/CN2020/106299
§ 371 (c)(1),
(2) Date: Dec. 16, 2022

(87) PCT Pub. No.: WO2022/021362
PCT Pub. Date: Feb. 3, 2022

(65) Prior Publication Data
US 2024/0243822 A1    Jul. 18, 2024

(51) Int. Cl.
*H04B 17/345* (2015.01)
*H04W 24/10* (2009.01)

(52) U.S. Cl.
CPC ......... *H04B 17/345* (2015.01); *H04W 24/10* (2013.01)

(58) Field of Classification Search
CPC .............................. H04B 17/345; H04W 24/10
See application file for complete search history.

(56) References Cited

U.S. PATENT DOCUMENTS

2013/0100838 A1* 4/2013 Iwamura ........... H04W 36/0085
370/252
2018/0337756 A1* 11/2018 Nam .................... H04W 72/541
(Continued)

FOREIGN PATENT DOCUMENTS

CN    110383722 A    10/2019
CN    111417133 A     7/2020
(Continued)

OTHER PUBLICATIONS

"3rd Generation Partnership Project, Technical Specification Group Radio Access Network, NR, Radio Resource Control (RRC) Protocol Specification (Release 16)", 3GPP Draft, DRAFT_38331-G10, 3rd Generation Partnership Project, Mobile Competence Centre, 650, Route Des Lucioles, F-06921, Sophia-Antipolis Cedex, France, Jul. 24, 2020, 906 pages, XP052353422, paragraph [5.5.3].
(Continued)

*Primary Examiner* — Deepa Belur
(74) *Attorney, Agent, or Firm* — ArentFox Schiff, LLP

(57) ABSTRACT

Aspects described herein relate to receiving a configuration for cross-link interference (CLI) measurement reporting, wherein the configuration includes, for each component carrier of one or more component carriers, one or more parameters for measuring signals on the component carrier, and a resource setting indicating resources of the component carrier over which to measure signals. One or more measurements of signals received on the resources indicated by the resource setting for the component carrier can be measured based at least in part on the one or more parameters, and reported to a base station.

30 Claims, 7 Drawing Sheets

(56) References Cited

U.S. PATENT DOCUMENTS

| | | | |
|---|---|---|---|
| 2019/0223036 A1* | 7/2019 | Lunttila | H04L 5/0064 |
| 2020/0007300 A1* | 1/2020 | Wang | H04L 5/0094 |
| 2020/0169341 A1 | 5/2020 | Hwang et al. | |
| 2020/0228212 A1 | 7/2020 | Xu et al. | |
| 2020/0245166 A1 | 7/2020 | Kwak et al. | |
| 2021/0006997 A1* | 1/2021 | Jin | H04W 24/10 |
| 2021/0368371 A1* | 11/2021 | Wang | H04L 5/0073 |
| 2022/0116129 A1* | 4/2022 | Ying | H04B 7/0617 |
| 2022/0191724 A1* | 6/2022 | Hwang | H04B 17/336 |
| 2022/0201524 A1* | 6/2022 | Ying | H04W 74/0866 |

FOREIGN PATENT DOCUMENTS

| | | |
|---|---|---|
| CN | 111417199 A | 7/2020 |
| EP | 3567759 A1 | 11/2019 |
| WO | 2018201906 A1 | 11/2018 |
| WO | 2020144624 A1 | 7/2020 |

OTHER PUBLICATIONS

Nokia, et al., "UE CLI Measurement for Multi Connectivity", R2-1914590, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019, 3 Pages, XP051816646, Paragraph [0002].
Supplementary European Search Report—EP20947251—Search Authority—Munich—Apr. 16, 2024.
International Search Report and Written Opinion—PCT/CN2020/106299—ISA/EPO—Apr. 19, 2021.

* cited by examiner

TECHNIQUES FOR CROSS LINK INTERFERENCE REPORTING IN WIRELESS COMMUNICATIONS

This application is a 35 U.S.C. § 371 National Phase of International Patent Application No. PCT/CN2020/106299, entitled "TECHNIQUES FOR CROSS LINK INTERFERENCE REPORTING IN WIRELESS COMMUNICATIONS" and filed on Jul. 31, 2020, the disclosure of which is hereby incorporated by reference in its entirety.

BACKGROUND

Aspects of the present disclosure relate generally to wireless communication systems, and more particularly, to performing cross link interference (CLI) reporting.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In NR, a base station can configure a user equipment (UE) to measure CLI caused on downlink resources from uplink transmissions of other UEs, where the measurements and reporting can be in layer 3 (e.g., radio link control (RLC) layer). The layer 3 measurements can corresponding to sounding reference signal (SRS) reference signal received power (RSRP) based on configured SRS measurement resources or CLI received signal strength indicator (RSSI) based on configured CLI RSSI measurement resources. Based on reported CLI measurements, the base station or other network components can know how UEs interfere with one another in their uplink/downlink transmission directions, and can accordingly schedule the UEs to avoid CLI.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes receiving, from a base station, a configuration for cross-link interference (CLI) measurement reporting. The configuration includes, for each component carrier of one or more component carriers, an identifier of the component carrier, one or more parameters for measuring signals on the component carrier, and a resource setting indicating resources of the component carrier over which to measure signals. The method includes measuring, based at least in part on the one or more parameters, one or more measurements of signals received on the resources indicated by the resource setting for the component carrier, and reporting, based on the configuration and measuring the signals, the one or more measurements to the base station.

According to another aspect, a method of wireless communication is provided. The method includes transmitting, to a user equipment (UE), a configuration for cross-link interference (CLI) measurement reporting. The configuration includes, for each component carrier of one or more component carriers, an identifier of the component carrier, one or more parameters for measuring signals on the component carrier, and a resource setting indicating resources of the component carrier over which to measure signals. The method also includes receiving, from the UE and based at least in part on the one or more parameters, one or more measurements of signals received on the resources indicated by the resource setting for the component carrier.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
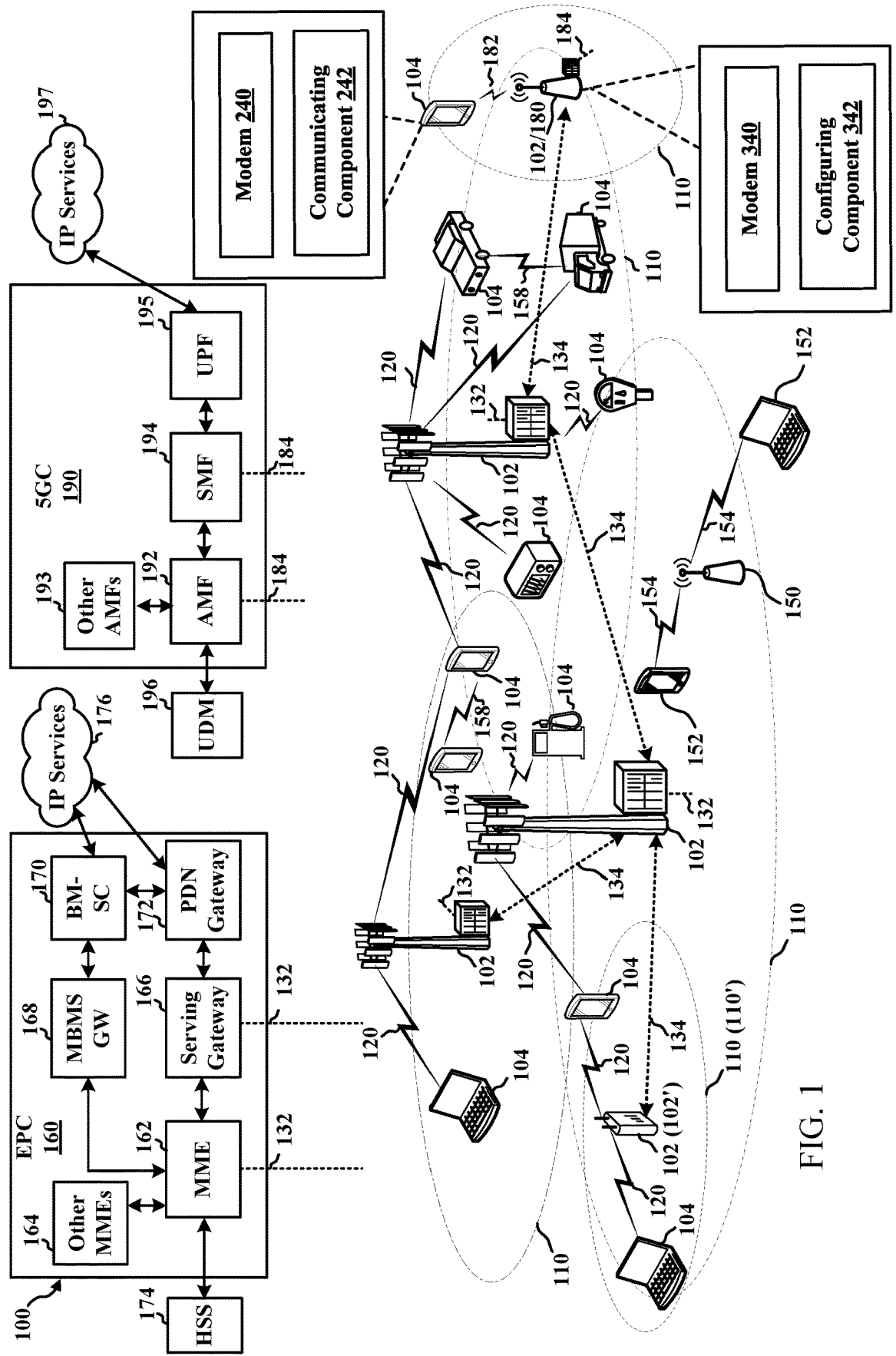
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to layer 1 (e.g., physical (PHY) layer) measurement and reporting of cross link interference (CLI), which can be more flexible, more efficient, and less complex than layer 3 measurement and reporting of CLI. For example, a UE can be configured to measure CLI (UE to UE interference) caused by uplink transmission from another UE over downlink resources configured for receiving communications from a base station. A base station or other network node can configure a UE to measure in its downlink the uplink transmission from another UE. This allows a victim UE to measure and report CLI from one or more aggressor UEs without knowing the time division duplexing (TDD) uplink (UL) downlink (DL) configuration or sounding reference signal (SRS) configuration of the aggressor UE(s). In this regard, for example, the network can configure the CLI measurement for the victim UE to match the TDD UL DL configuration or SRS configuration of the aggressor UE(s) so the victim UE receives and can measure signals transmitted by the aggressor UE(s). In addition, configuring CLI measurement and reporting can allow the network to know how UEs interfere with each other, e.g., if their UL/DL transmission directions conflict due to flexible (different) time division duplexing (TDD) uplink (UL) downlink (DL) configurations for the UEs.

In some radio access technologies, such as fifth generation (5G) new radio (NR), layer 3 (e.g., radio link control (RLC) layer) CLI measurement and reporting is supported, which can include measurement metrics for SRS-reference signal received power (RSRP) or CLI-received signal strength indicator (RSSI). SRS-RSRP can be a linear average of power contributions of the SRS to be measured over the configured resource elements within the considered measurement frequency bandwidth in the time resources in the configured measurement occasions. CLI-RSSI can be a linear average of total received power observed only in certain orthogonal frequency division multiplexing (OFDM) symbols of measurement time resource(s), in the measurement bandwidth, over the configured resource elements for measurement by the UE. In some instances, layer 3 measurement and reporting may not be flexible or efficient enough for measuring dynamic CLI due to dynamic TDD configuration of aggressor UEs.

Aspects described herein relate to providing layer 1 (e.g., PHY layer) CLI measurement and reporting to improve flexibility and efficiency at least for measuring dynamic CLI even in the case of dynamic TDD configuration of aggressor UEs. In some examples, a UE can be provided with a higher layer configuration of one or more CLI reporting settings, which may each be associated with one or more CLI resource settings. The CLI reporting settings may include one or more parameters related to measuring and reporting the CLI, and the CLI resource settings may indicate resources (e.g., non-zero power resources of aggressor UE(s) and/or zero power resources) over which the measured CLI can be reported. In an example, a base station may provide the UE with the configuration for performing CLI measurement and reporting. In an example, other configured layer 1 reporting can be reused to facilitate CLI measurement reporting. For example, channel state information (CSI) reporting can be used to report measured CLI, which may be based on a new report quantity specified for CSI reporting. In this example, priority rules and/or CSI processing unit (CPU) limits can be specified with respect to reporting CLI and CSI.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for performing layer 1 CLI measurements, in accordance with aspects described herein. In addition, some nodes may have a modem 340 and configuring component 342 for configuring a device for performing layer 1 CLI measurements, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IOT (also referred to as CAT NB1) UEs, as well as other types of UEs. In the present disclosure, eMTC and NB-IOT may refer to future technologies that may evolve from or may be based on these technologies. For example, eMTC may include FeMTC (further eMTC), eFeMTC (enhanced further eMTC), mMTC (massive MTC), etc., and NB-IOT may include eNB-IoT (enhanced NB-IOT), FeNB-IOT (further enhanced NB-IOT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, configuring component 342 of a base station 102 can configure one or more UEs 104 for performing layer 1 CLI measurement and reporting, which can include transmitting a higher layer configuration indicating reporting settings and resource settings for each of one or more component carriers (CCs). Communicating component 242 of a UE can receive the configuration and can accordingly perform CLI measurements of other UEs based on the reporting settings and the resource settings for a given CC. In an example, communicating component 242 can use indications of a CSI configuration to determine the reporting settings and/or the resource settings. In any case, communicating component 242 can report the CLI measurements to the base station 102, which can use the CLI measurements for assigning communication resources to the UE 104 and/or other UEs for which CLI is measured.

Figure 2:
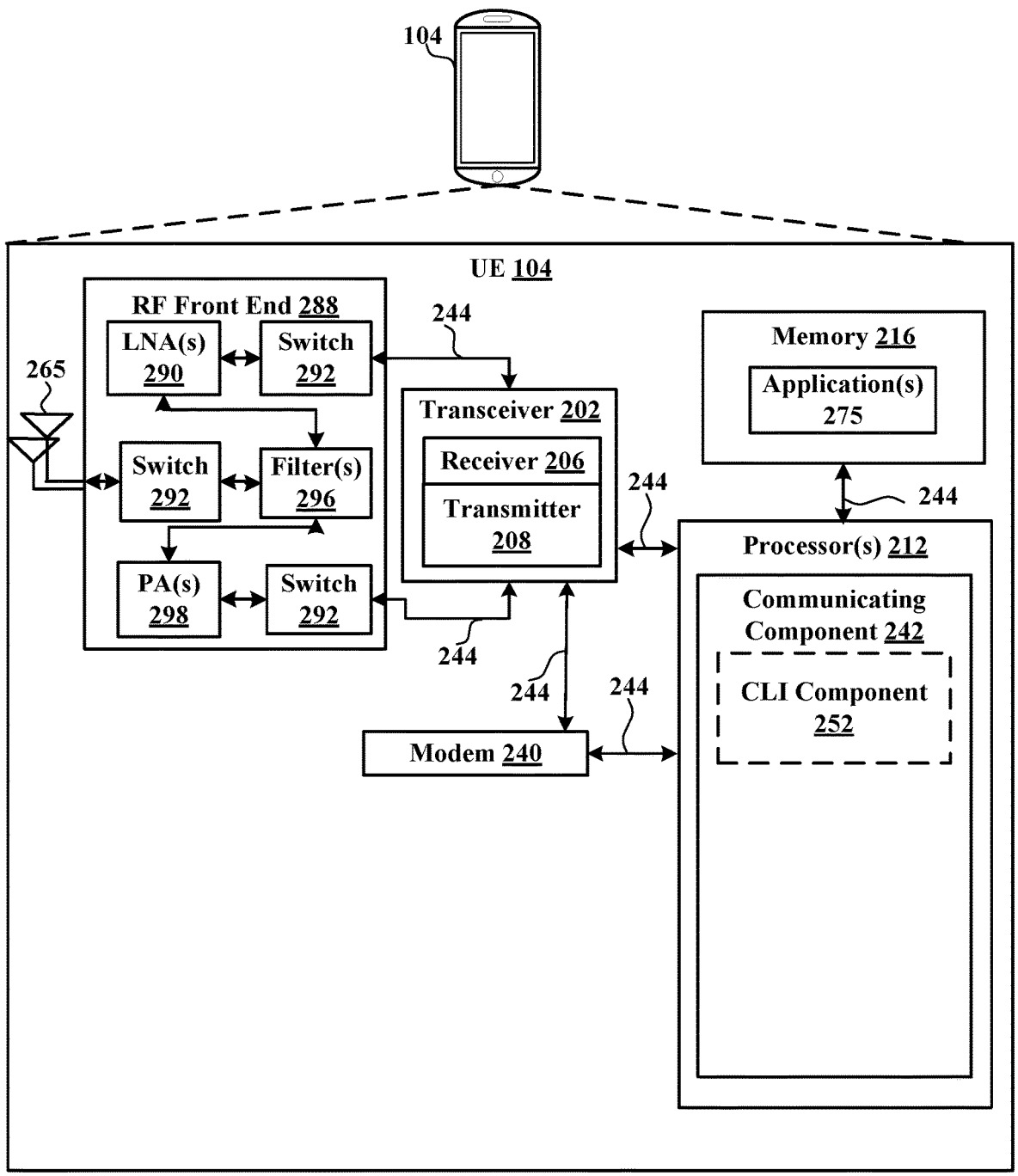
FIG. 2 is a block diagram illustrating an example of a UE, in accordance with various aspects of the present disclosure.
Figure 3:
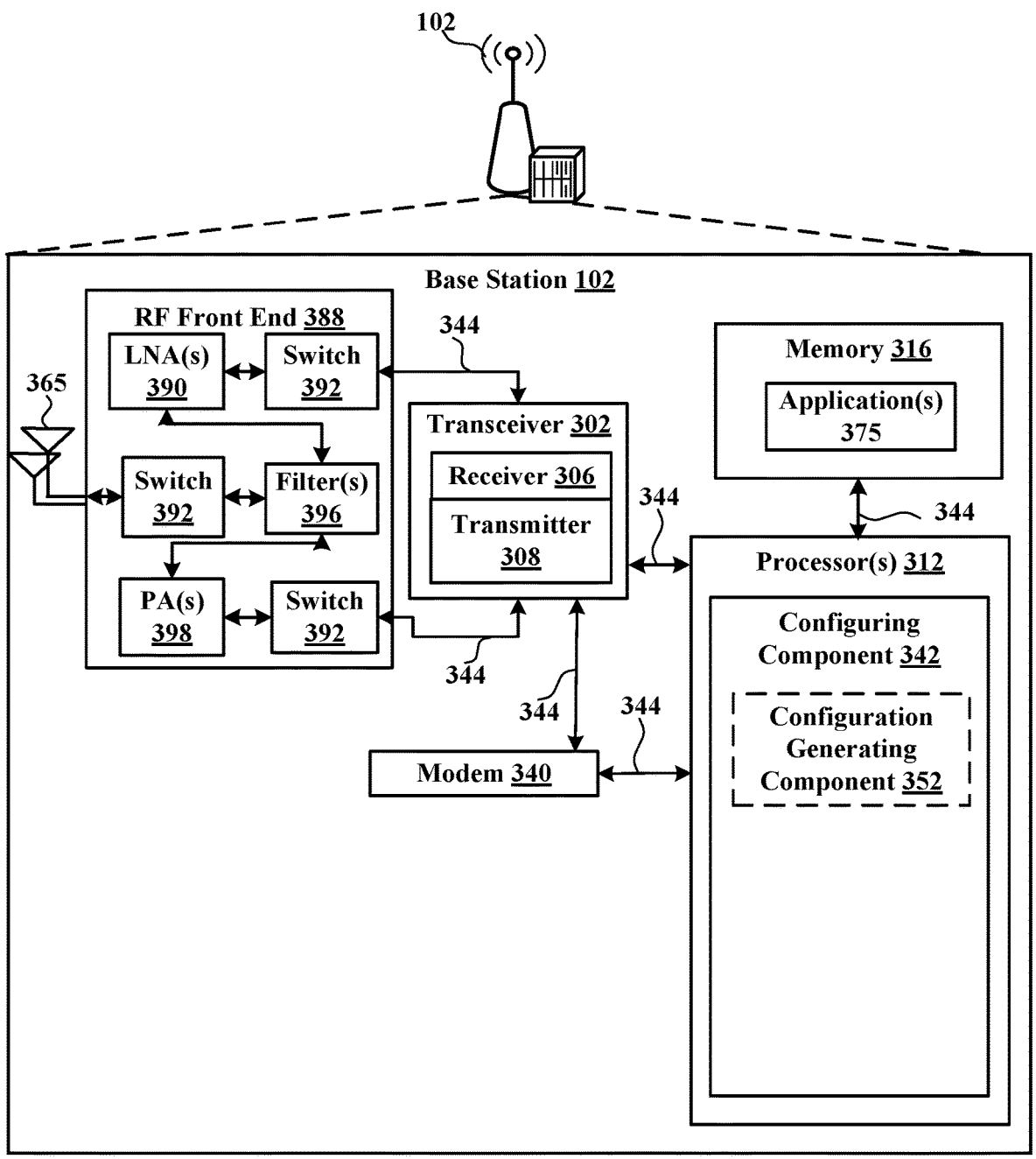
FIG. 3 is a block diagram illustrating an example of a base station, in accordance with various aspects of the present disclosure.
Figure 4:
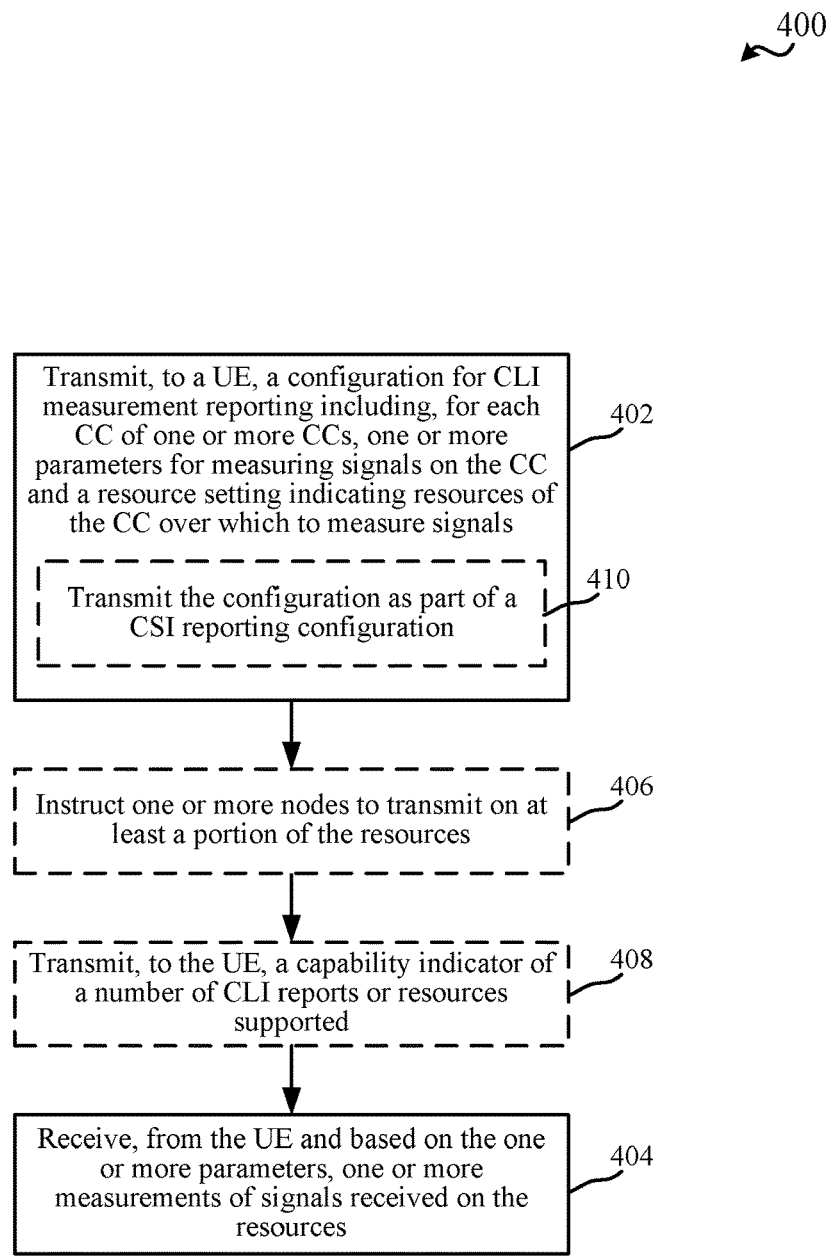
FIG. 4 is a flow chart illustrating an example of a method for performing and reporting cross link interference (CLI) measurements, in accordance with various aspects of the present disclosure.
Figure 5:
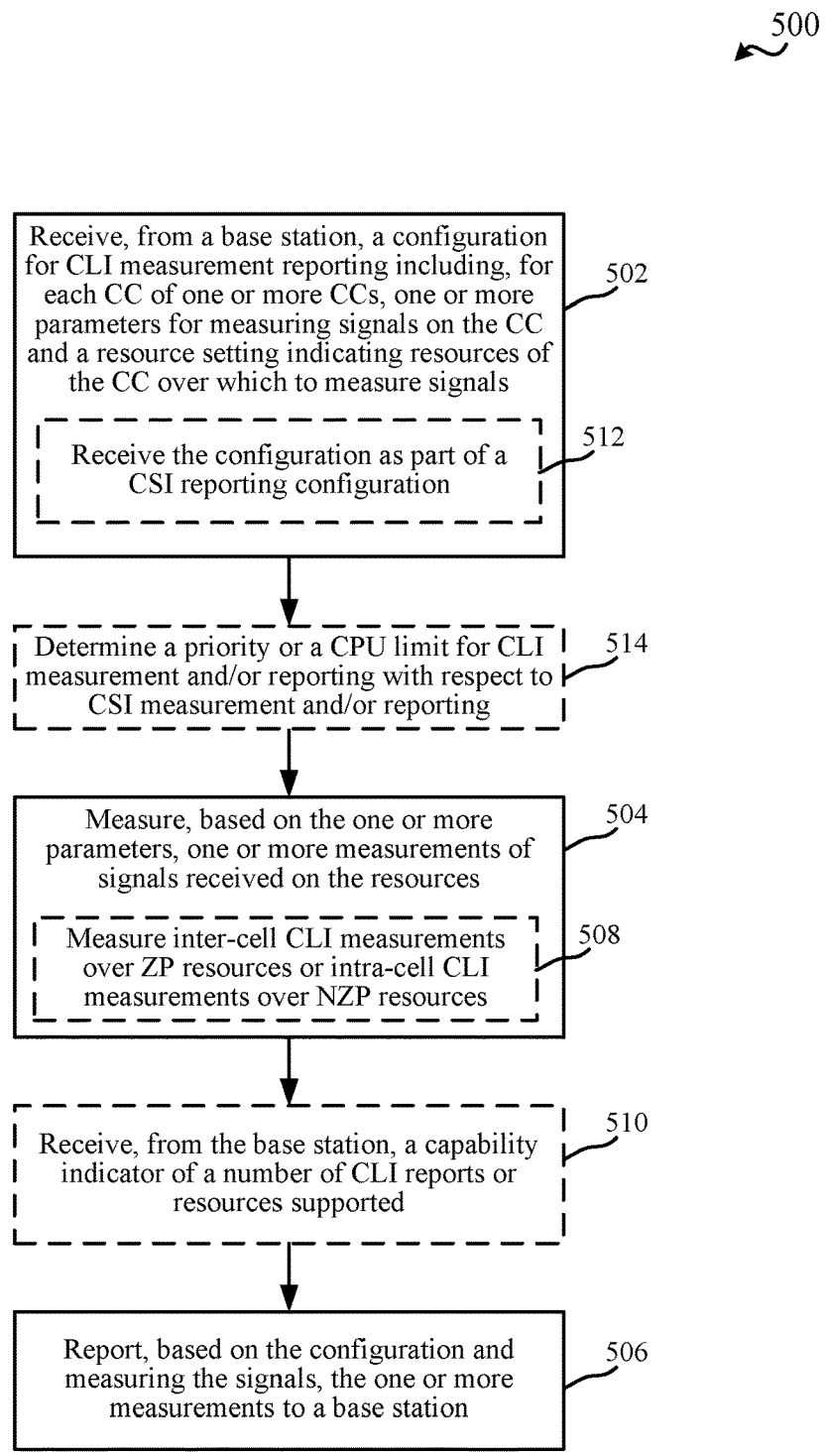
FIG. 5 is a flow chart illustrating an example of a method for configuring a device for performing and reporting CLI measurements, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing layer 1 CLI measurements, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a CLI component 252 for performing CLI measurement and reporting based on CLI reporting settings and/or corresponding CLI resource settings in a received configuration, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for performing layer 1 CLI measurements, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a configuration generating component 352 for generating a configuration for transmitting to a UE for performing layer 1 CLI measurements where the configuration may indicate, for each CC of one or more CCs, CLI reporting settings and/or CLI resource settings for measuring and reporting CLI, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for configuring a device for performing layer 1 CLI measurement and reporting, in accordance with aspects described herein. In an example, a base station 102 can perform the functions described in method 400 using one or more of the components described in FIGS. 1 and 3. FIG. 5 illustrates a flow chart of an example of a method 500 for performing layer 1 CLI measurement and reporting, in accordance with aspects described herein. In an example, a UE 104 can perform the functions described in method 500 using one or more of the components described in FIGS. 1 and 2. Methods 400 and 500 are described in conjunction for ease of explanation, but the methods 400 and 500 are not required to be performed together, and different nodes/devices can perform one of the methods 400 or 500 without requiring other nodes/devices to perform the other of the methods 400 or 500.

In method 400, at Block 402, a configuration for CLI measurement reporting including, for each CC of one or more CCs, one or more parameters for measuring signals on the CC and a resource setting for indicating resources of the CC over which to measure signals can be transmitted to a UE. In an aspect, configuring component 342, e.g., in conjunction with processor(s) 312, memory 316, transceiver 302, etc., can transmit, to a UE (e.g., UE 104), a configuration for CLI measurement reporting including, for each CC of one or more CCs, one or more parameters for measuring signals on the CC and a resource setting indicating resources of the CC over which to measure signals. For example, configuration generating component 352 can generate the configuration for CLI measurement reporting by the UE 104 to enable layer 1 CLI measurement and reporting. In an example, configuration generating component 352 can generate the configuration to include an identifier of the CC as well to allow the UE 104 to determine, for a given CC, the reporting settings and resource settings for measuring and reporting CLI.

Figure 6:
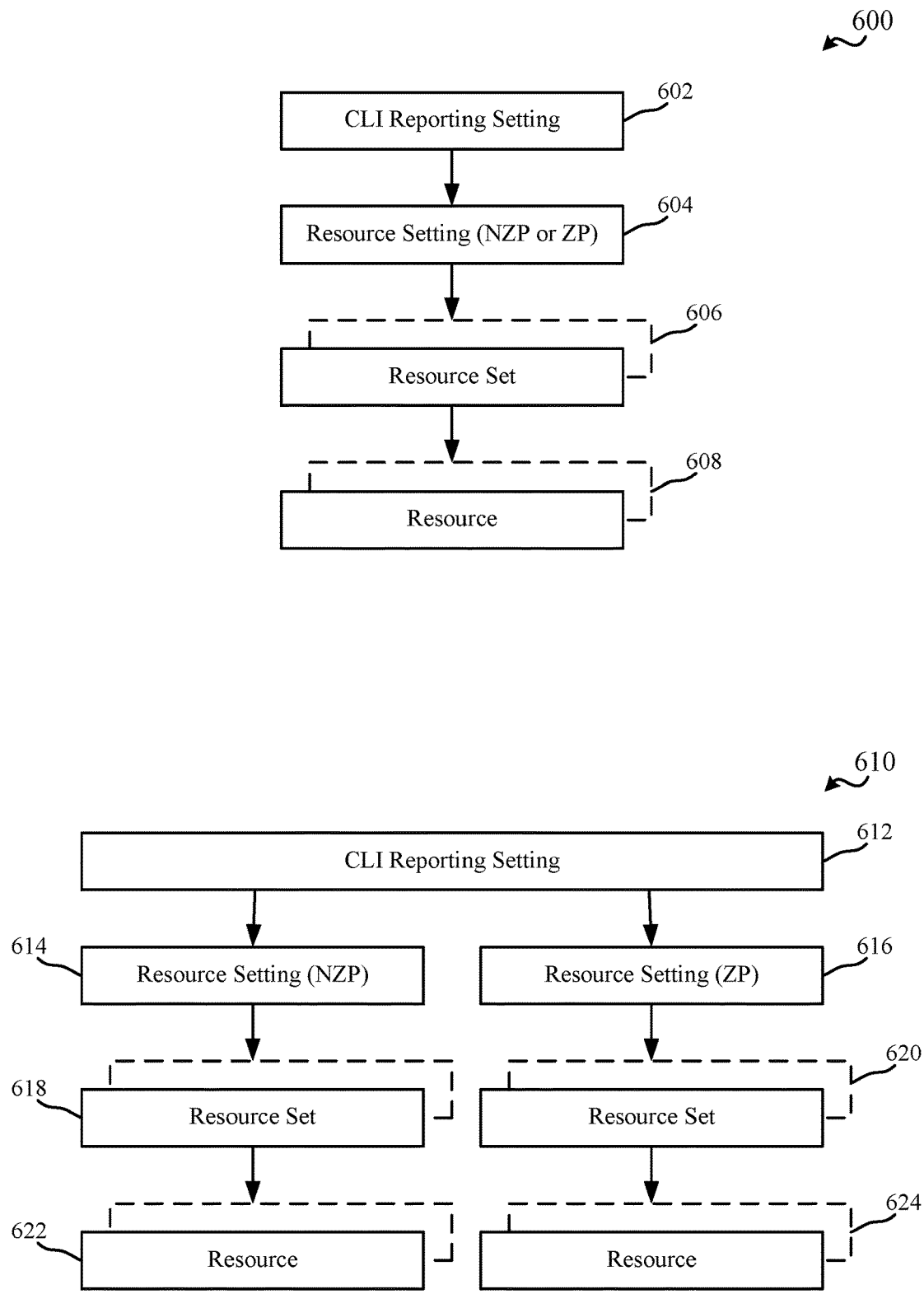
FIG. 6 illustrates examples of configuration structures for configuring a device for performing and reporting CLI measurements, in accordance with various aspects of the present disclosure.

FIG. 6 illustrates examples of configuration structures 600, 610 of the configuration for CLI measurement reporting. In an example, a configuration structure 600 includes at least one CLI reporting setting 602 (and may include multiple CLI reporting settings 602). Each CLI reporting setting 602 can be configured for the UE and associated with a single DL bandwidth part (BWP) configured for the UE. In addition, each CLI reporting settings 602 can include a carrier index ("carrier") for cross-carrier CLI measurement triggering by DCI received on another carrier and/or information for the UE to measure and report CLI, such as a report quantity (e.g., an indication of whether to report RSRP, RSSI, or other measurement value). In addition, each CLI reporting setting 602 can include one or more resource settings 604 for either non-zero power (NZP) resources (e.g., of aggressor UEs) or zero power (ZP) resources. For example, the resource settings 604 can indicate one or more resource sets 606, each of which may refer to one or more resources 608 over which to measure signals for CLI measurement and reporting. In an example, the one or more resources 608 can include an indication of time and/or frequency resources (e.g., an OFDM symbols index of an OFDM symbol within a slot, a slot index, a periodicity or offset of such resources, etc.) over which to measure signals for CLI measurement and reporting. In an example, for NZP resource settings, the resource configuration can correspond to SRS or UL demodulation reference signal (DMRS) and may be linked to report quantity of RSRP or RSSI. In an example, for ZP resource settings, the resource configuration can correspond to channel state information (CSI) reference signal (RS) resources for interference measurement (CSI-IM), where the time and frequency pattern may optionally be occupied in all resource elements within a resource block. In addition, ZP resources may be linked to report quantity of RSSI.

In another example, a configuration structure 610 can include at least one CLI reporting setting 612, which can include separate resource settings for NZP and ZP resources, including resource setting 614 and resource setting 616. Each resource setting 614 and 616 can include its own resource set, such as resource set 618 for NZP resources and resource set 620 for ZP resources, which can each include corresponding resources 622, 624. In either case, in an example, ZP resources can be indicated for inter-cell CLI measurement, and NZP resources can be indicated for intra-cell CLI measurement. In an example, resource settings 604, 614, and/or 616 may include indicator of whether the corresponding resource settings are for inter-cell CLI measurement or intra-cell CLI measurement.

In any case, for example, configuring component 342 can transmit the configuration for CLI measurement and reporting to the UE 104 using radio resource control (RRC) signaling or other control signaling.

In method 500, at Block 502, a configuration for CLI measurement reporting including, for each CC of one or more CCs, one or more parameters for measuring signals on the CC and a resource setting for indicating resources of the CC over which to measure signals can be received from a base station. In an aspect, communicating component 242, e.g., in conjunction with processor(s) 212, memory 216, transceiver 202, etc., can receive, from the base station (e.g., base station 102), the configuration for CLI measurement reporting including, for each CC of one or more CCs, one or more parameters for measuring signals on the CC and a resource setting for indicating resources of the CC over which to measure signals. For example, communicating component 242 can receive the configuration from the base station 102 in RRC or other control signaling, and the configuration may include, for each CC or one or more CCs, an identifier of the CC, one or more CLI reporting settings, one or more corresponding CLI resource settings (for NZP or ZP resources, in a single or separate lists), corresponding resource set(s) of resource(s), etc.

In method 500, at Block 504, one or more measurements of signals received on the resources can be measured based on the one or more parameters in the configuration. In an aspect, CLI component 252, e.g., in conjunction with processor(s) 212, memory 216, transceiver 202, communicating component 242, etc., can measure, based on the one or more parameters, one or more measurements of signals received on the resources. For example, CLI component 252 can determine CLI reporting settings corresponding to a CC over which the UE is configured for communications. In an example, based on the CLI reporting settings, CLI component 252 can determine, based on the one or more parameters in the configuration as specified for the CC, one or more resource settings corresponding to one or more resource sets of one or more indicated resources for measuring signals for CLI. CLI component 252 can measure signals received from one or more other UEs over the various resources. As described, in an example, the one or more resource settings may correspond to NZP or ZP resources (of the aggressor UE). In addition, in one example, the NZP and ZP resources may be differentiated into different resource settings for the CLI reporting setting. In any case, CLI component 252 can perform measurements of signals over the CLI resources indicated in one or more CLI resource settings for one or more CLI reporting settings for the CC. Moreover as described, for example, the CLI reporting setting can indicate the report quantity (e.g., RSRP, RSSI, etc.), and CLI component 252 can accordingly measure the report quantity of received signals over the resources.

In method 500, at Block 506, the one or more measurements can be reported to a base station based on the configuration and measuring the signals. In an aspect, CLI component 252, e.g., in conjunction with processor(s) 212, memory 216, transceiver 202, communicating component 242, etc., can report, based on the configuration and measuring the signals, the one or more signal measurements to the base station (e.g., base station 102). For example, CLI component 252 can transmit, to the base station 102, an indication of one or more signal measurements of signals (e.g., of the report quantity, such as RSRP, RSSI, etc.) received over the resources. In an example, the configuration received from the base station 102 may also indicate reporting resources over which to transmit the report to the base station, and CLI component 252 can transmit the report over the indicated reporting resources. For example, CLI component 252 can transmit the report over resources of an uplink channel, such as a physical uplink control channel (PUCCH), physical uplink shared channel (PUSCH), etc., which may be specified by the configuration or otherwise indicated to the UE 104 (e.g., in a resource grant).

In method 400, at Block 404, one or more measurements of signals received on the resources can be received from the UE and based on the one or more parameters in the configuration. In an aspect, configuring component 342, e.g., in conjunction with processor(s) 312, memory 316, transceiver 302, etc., can receive, from a UE (e.g., UE 104) and based on the one or more parameters, one or more measurements of signals received on the resources. As described, the measurements can correspond to report quantities (e.g., RSRP, RSSI, etc.) of the signals as specified in the configuration. In an example, configuring component 342 can use the measurements to determine CLI conditions for the UE 104 reporting the measurements, and can accordingly schedule resources for the UE 104 or other UEs, determine TDD UL DL configuration, SRS configuration, etc. to mitigate CLI for the UE 104 (e.g., such to avoid conflicting downlink resources for UE 104 and uplink resources for nearby UEs).

In method 400, optionally at Block 406, one or more nodes can be instructed to transmit on at least a portion of the resources. In an aspect, configuring component 342, e.g., in conjunction with processor(s) 312, memory 316, transceiver 302, etc., can instruct one or more nodes (e.g., other UEs) to transmit on at least a portion of the resources. For example, configuring component 342 can instruct aggressor UEs to transmit signals on ZP resources specified in the configuration for UE 104. This can ensure the UE 104 is able to measure signals from aggressor UEs over the ZP resources to obtain a measurement for CLI measurement reporting.

In measuring the one or more measurements of signals received on the resources at Block 504, optionally at Block 508, inter-cell CLI measurements can be measured over ZP resources or intra-cell CLI measurements can be measured over NZP resources. In an aspect, CLI component 252, e.g., in conjunction with processor(s) 212, memory 216, transceiver 202, communicating component 242, etc., can measure inter-cell CLI measurements over ZP resources or intra-cell CLI measurements over NZP resources. For example, CLI component 252 can distinguish ZP and NZP resources based on the configuration, which can indicate whether a resource setting applies to ZP or NZP resources based on an indicator or based on which list includes the resource setting, etc., as described above. In another example, CLI component 252 may measure inter-cell CLI measurements over NZP resources or intra-cell CLI measurements over ZP resources. In yet another example, regardless of whether the resource setting is for NZP or ZP resources, the resource setting may include an indicator indicating whether to measure the resources for inter-cell or intra-cell CLI measurements, and CLI component 252 can accordingly perform the inter-cell or intra-cell CLI measurements for reporting to the base station.

In method 400, optionally at Block 408, a capability indicator of a number of CLI reports or resources supported can be transmitted to the UE. In an aspect, configuring component 342, e.g., in conjunction with processor(s) 312, memory 316, transceiver 302, etc., can transmit, to the UE, the capability indicator of the number of CLI reports or resources supported. For example, the capability indicator can be included in a higher layer configuration (e.g., RRC configuration) and may be CLI report related or CLI resource related. For example, the capability indicator may indicate a maximum CLI report number to be configured, a maximum CLI resource number to be configured, a maximum CLI resource number to process simultaneously, etc. The capacity configurations could be based on per band or band combinations.

In method 500, optionally at Block 510, a capability indicator of a number of CLI reports or resources supported can be received from the base station. In an aspect, communicating component 242, e.g., in conjunction with processor(s) 212, memory 216, transceiver 202, etc., can receive, from the base station, the capability indicator of the number of CLI reports or resources supported. For example, communicating component 242 can receive the indication in RRC signaling (e.g., in the configuration received at Block 502 or otherwise), and CLI component 252 can determine a number of CLI resource to measure at Block 504 and/or a number of CLI measurement values to report at Block 506 based at least on the capability indicator of the base station 102 (e.g., based on a number not to exceed the maximum number indicated by the capability indicator).

In an example, a framework used for CSI reporting can also be used for the CLI measurement reporting. In this example, some CSI parameters can be reused and/or new parameters can be defined within the CSI framework to allow for use for CLI measurement reporting. In an example, in transmitting the configuration at Block 402, optionally at Block 410, the configuration can be transmitted as part of a CSI reporting configuration. In an aspect, configuring component 342, e.g., in conjunction with processor(s) 312, memory 316, transceiver 302, etc., can transmit the configuration as part of the CSI reporting configuration. In this example, configuration generating component 352 can generate the configuration for CLI measurement reporting as part of the CSI reporting configuration used for reporting CSI. In an example, configuration generating component 352 can reuse current CSI reporting quantity for CLI measurement report. For instance, the report quantity can be "CRI-PMI-RI-CQI," as defined in 5G NR, and there can be both resources for channel measurement and CLI measurement resource (e.g., SRS resource). In this example, the CSI report of serving cell channel quality indicator (CQI) may depend on the channel measurement (e.g., legacy CSI) and/or interference measured from CLI resources. In this example, the UE 104 can report the measurements taken for CLI along with the legacy CSI. In another example, the configuration can use a new CSI report quantity defined for CLI measurement, such as "L1-CLI-RSRP," "L1-CLI-RSSI," etc. In this example, the UE 104 can report the measurements using the CSI report quantity, as described herein. In another example, the configuration can use a new CSI report quantity targeting for resource-set-specific, such as new report quantity is "CRI-CLI-RSRP," "CRI-CLI-RSSI," etc. to be measured over specific resource sets. In this example, if multiple resources are configured for CLI measurement, the UE 104 can select a single or a subset of resources for reporting. In addition, in this example, wideband or subband (differential-based) CLI report could be supported and/or subband granularity could be indicated in an RRC configuration value, such as reportFreqConfiguration.

In receiving the configuration at Block 502, optionally at Block 512, the configuration can be received as part of a CSI reporting configuration. In an aspect, communicating component 242, e.g., in conjunction with processor(s) 212, memory 216, transceiver 202, etc., can receive the configuration as part of the CSI reporting configuration. In the various examples described above, CLI component 252 can determine how to report the CLI using the CSI configuration and can accordingly report the one or more measurements at Block 506. For example, as described and based on the CSI configuration, CLI component 252 can report the measurements as a CQI based on the measurements and/or correspond CSI channel measurement. In another example, CLI component 252 can report the CLI measurements using a new report quantity defined for CLI measurements, using a new report quantity targeting resource-set-specific, etc. In any case, the base station 102 can determine the CLI measurements as reported and can determine TDD UL DL configuration, SRS configuration, or other scheduling for the UE 104 or other UEs based on the CLI measurements.

In addition, where CSI reporting is reused for CLI measurements, priority rules and/or CPU limits can be defined for, or in consideration of, the CLI measurements. In method 500, optionally at Block 514, a priority or a CPU limit for CLI measurement and/or reporting with respect to CSI measurement and/or reporting can be determined. In an aspect, CLI component 252, e.g., in conjunction with processor(s) 212, memory 216, transceiver 202, communicating component 242, etc., can determine the priority or the CPU limit for CLI measurement and/or reporting with respect to CSI measurement and/or reporting, and can accordingly measure signals and/or report measurements for CLI based on the determined priority and/or CPU limit.

For example, CSI reports can be associated with a priority value $Pri_{iCSI}(y, k, c, s) = 2 \cdot N_{cells} \cdot M_s \cdot y + N_{cells} \cdot M_s \cdot k + M_s \cdot c + s$ (as defined in 5G NR) where for the UL channel carrying CLI report, y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH (same as legacy CSI). Currently, in 5G NR, k=0 for CSI reports carrying L1-RSRP and k=1 for CSI reports not carrying L1-RSRP. In an example, CLI component 252 can define priority order for CLI report (with respect to other CSI reports) by adjusting k values. For example, CLI component 252 can set k=0 for CSI reports carrying L1-RSRP and, k=1 for CSI reports carrying L1-CLI report, and k=2 for other CSI reports. Legacy CSI report and CLI-specific report may collide if the time occupancy of the physical channels scheduled for reporting overlap in at least one OFDM symbol and are transmitted on the same carrier. When UE 104 is configured to transmit these two reports collided, two CSI reports can be multiplexed or either is dropped based on the priority values.

In another example, in 5G NR, number of CPUs is counted per CSI-RS resource for channel measurement unless there is fast CSI reporting (which occupies all CPUs). For a CSI report configuration with reportQuantity set to "CRI-CLI-RSRP" and "CRI-CLI-RSSI," the CPU unit occupation can correspond to a CPU number occupied for processing a CLI report is the number of ZP or NZP resources in the resource set for CLI measurement. In this example, the CPU occupation time for CSI report related to CLI measurement can be different for periodic, semi-persistent, or aperiodic reports. For example, for periodic or semi-persistent, occupies CPU(s) from the first symbol of the earliest one of each ZP/NZP CLI resource for CLI measurement, respective latest ZP/NZP CLI occasion no later than the corresponding CSI reference resource, until the last symbol of the PUSCH/PUCCH carrying the report. For aperiodic, occupies CPU(s) from the first symbol after the PDCCH triggering the CSI report until the last symbol of the PUSCH carrying the report. In this example, in any slot, the UE may not be expected to have more active CLI resources for CLI measurement than the maximum CLI resource number to be configured indicated in the capability at Block 510, and in any slot, the UE may not be expected to handle more CLI resource/port number than the maximum CLI resource number to process simultaneously indicated in the capability indicated at Block 510.

Figure 7:
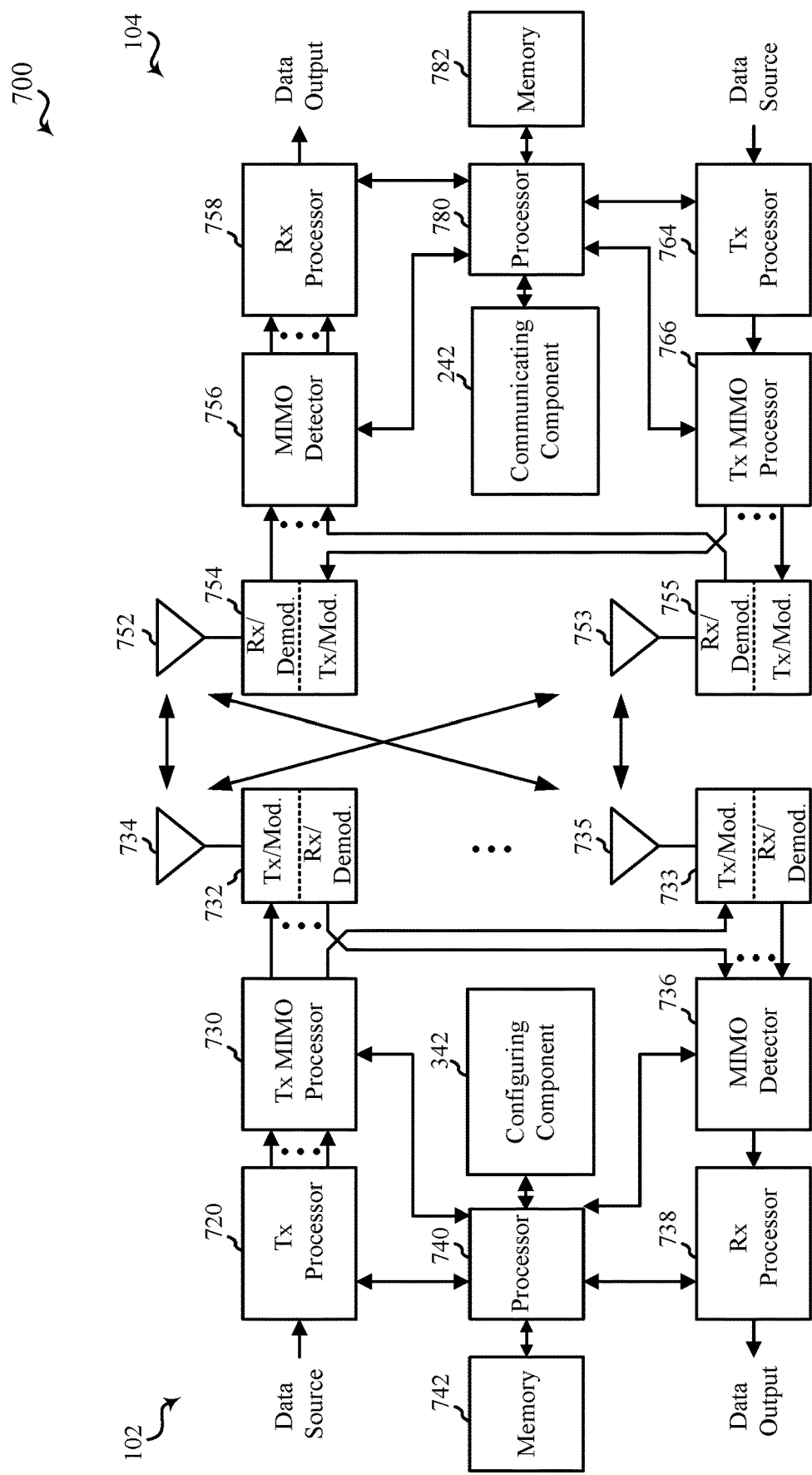
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

Additionally, an Appendix is attached and includes additional description and figures relating to the present disclosure.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communications, comprising:
receiving, from a base station, a configuration for cross-link interference (CLI) measurement reporting, wherein the configuration includes, for each component carrier of one or more component carriers:
an identifier of the component carrier;
one or more parameters for measuring signals on the component carrier; and
a resource setting indicating resources of the component carrier over which to measure signals;
measuring, based at least in part on the one or more parameters, one or more measurements of signals received on the resources indicated by the resource setting for the component carrier; and
reporting, based on the configuration and measuring the signals, the one or more measurements to the base station.

2. The method of example 1, wherein the one or more parameters indicated in the configuration include at least one of a received signal strength indicator (RSSI) or a reference signal received power (RSRP).

3. The method of any of examples 1 or 2, wherein the resource setting indicates the resources as including at least one of non-zero power resources of one or more nodes over which to measure signals received from the one or more nodes or zero power resources over which to measure reference signals from the one or more nodes.

4. The method of example 3, wherein measuring the one or more measurements includes at least one of measuring inter-cell CLI measurements over zero power resources or measuring intra-cell CLI measurements over non-zero power resources.

5 The method of any of examples 3 or 4, wherein the configuration includes an indicator indicating whether a resource in the resources is utilized for inter-cell or intra-cell measurements.

6. The method of any of examples 1 to 5, wherein the one or more parameters include an indication of time and frequency resources for measuring the signals.

7. The method of any of examples 1 to 6, wherein the resource setting indicates the resources as including non-zero power resources of one or more nodes over which to measure signals, wherein the resource setting indicates resources of a sounding reference signal or an uplink demodulation reference signal, and wherein the one or more parameters indicated in the configuration include at least one of a received signal strength indicator (RSSI) or a reference signal received power (RSRP).

8. The method of any of examples 1 to 7, wherein the resource setting indicates the resources as including zero power resources of one or more nodes over which to measure reference signals, wherein the resource setting indicates resources of a channel state information reference signal (CSI-RS) for channel state information interference measurement (CSI-IM), and wherein the one or more parameters indicated in the configuration include a received signal strength indicator (RSSI).

9. The method of any of examples 1 to 8, further comprising receiving, from a base station, a capability indicator indicating a maximum number of CLI reports supported, wherein the configuration is based on the maximum number of CLI reports supported.

10. The method of example 9, wherein the capability indicator is band specific or band combination specific.

11. The method of any of examples 1 to 10, further comprising receiving, from a base station, a capability indicator indicating a maximum number of CLI resources supported or a maximum number of CLI resources that can be concurrently processed, wherein the configuration is based on the maximum number of CLI resources supported or the maximum number of CLI resources that can be concurrently processed.

12. The method of example 11, wherein the capability indicator is band specific or band combination specific.

13. The method of any of examples 1 to 12, wherein receiving the configuration includes receiving, from the base station, the configuration as part of a channel state information (CSI) reporting configuration.

14. The method of example 13, wherein the CSI reporting configuration includes the configuration based on indicating CLI measurement resources as related to sounding reference signal (SRS) resources.

15. The method of any of examples 13 or 14, wherein the CSI reporting configuration includes the configuration based on indicating CLI measurement resources based on a CLI report quantity identifier.

16. The method of example 15, wherein the CLI report quantity identifier corresponds to a specific resource set.

17. The method of any of examples 13 to 16, further comprising determining, based on whether the CSI reporting configuration indicates an aperiodic, semi-persistent, or periodic CSI report, a priority for CLI measurement reporting based on the configuration.

18. The method of any of examples 13 to 17, further comprising determining, based on whether the CSI reporting configuration indicates CLI measurement, a priority for a CSI report.

19. The method of any of examples 13 to 18, wherein measuring the one or more measurements of signals includes assigning a CSI processing unit (CPU) for each of a number of zero power or non-zero power resources indicated in the configuration.

20. The method of example 19, wherein assigning the CPU includes assigning the CPU such that, for periodic or semi-persistent CSI reports indicated in CSI reporting configuration, the CPU is occupied from an earliest one of each of zero power and non-zero power resources until a last symbol related to the reporting.

21. The method of any of examples 19 or 20, wherein assigning the CPU includes assigning the CPU such that, for an aperiodic CSI report indicated in CSI reporting configuration, the CPU is occupied from first symbol after triggering the aperiodic CSI report until a last symbol related to the reporting.

22. A method for wireless communications, comprising:
transmitting, to a user equipment (UE), a configuration for cross-link interference (CLI) measurement reporting, wherein the configuration includes, for each component carrier of one or more component carriers:
an identifier of the component carrier;
one or more parameters for measuring signals on the component carrier; and
a resource setting indicating resources of the component carrier over which to measure signals;
receiving, from the UE and based at least in part on the one or more parameters, one or more measurements of signals received on the resources indicated by the resource setting for the component carrier.

23. The method of example 22, wherein the one or more parameters indicated in the configuration include at least one of a received signal strength indicator (RSSI) or a reference signal received power (RSRP).

24. The method of any of examples 22 or 23, wherein the resource setting indicates the resources as including at least one of non-zero power resources of one or more nodes over which to measure signals received from the one or more nodes or zero power resources over which to measure reference signals from the one or more nodes.

25. The method of example 24, further comprising instructing the one or more nodes to transmit one or more reference signals during the zero power resources.

26. The method of any of examples 22 to 25, wherein the configuration includes an indicator indicating whether a resource in the resources is utilized for inter-cell or intra-cell measurements.

27. The method of any of examples 22 to 26, wherein the one or more parameters include an indication of time and frequency resources for measuring the signals.

28. The method of any of examples 22 to 27, wherein the resource setting indicates the resources as including non-zero power resources of one or more nodes over which to measure signals, wherein the resource setting indicates resources of a sounding reference signal or an uplink demodulation reference signal, and wherein the one or more parameters indicated in the configuration include at least one of a received signal strength indicator (RSSI) or a reference signal received power (RSRP).

29. The method of any of examples 22 to 28, wherein the resource setting indicates the resources as including zero power resources of one or more nodes over which to measure reference signals, wherein the resource setting indicates resources of a channel state information reference signal (CSI-RS) for channel state information interference measurement (CSI-IM), and wherein the one or more parameters indicated in the configuration include a received signal strength indicator (RSSI).

30. The method of any of examples 22 to 29, further comprising transmitting, to the UE, a capability indicator indicating a maximum number of CLI reports supported, wherein the configuration is based on the maximum number of CLI reports supported.

31. The method of any of examples 22 to 30, further comprising transmitting, to the UE, a capability indicator indicating a maximum number of CLI resources supported or a maximum number of CLI resources that can be concurrently processed, wherein the configuration is based on the maximum number of CLI resources supported or the maximum number of CLI resources that can be concurrently processed.

32. The method of any of examples 22 to 31, wherein transmitting the configuration includes transmitting the configuration as part of a channel state information (CSI) reporting configuration.

33. The method of example 32, wherein the CSI reporting configuration includes the configuration based on indicating CLI measurement resources as related to sounding reference signal (SRS) resources.

34. The method of any of examples 32 or 33, wherein the CSI reporting configuration includes the configuration based on indicating CLI measurement resources based on a CLI report quantity identifier.

35. The method of example 34, wherein the CLI report quantity identifier corresponds to a specific resource set.

36. An apparatus for wireless communication, comprising:
a transceiver;
a memory configured to store instructions; and
one or more processors communicatively coupled with the memory and the transceiver, wherein the one or more processors are configured to perform one or more of the methods of any of examples 1 to 35.

37. An apparatus for wireless communication, comprising means for performing one or more of the methods of any of examples 1 to 35.

38. A computer-readable medium, comprising code executable by one or more processors for wireless communications, the code comprising code for performing one or more of the methods of any of examples 1 to 35.

What is claimed is:

1. A method for wireless communications, comprising:
receiving, from a base station, a configuration for cross-link interference (CLI) measurement reporting, wherein the configuration indicates, for each component carrier of multiple component carriers:
 an identifier of the component carrier;
 one or more parameters for measuring signals related to CLI on the component carrier; and
 a resource setting indicating resources of the component carrier over which to measure the signals related to CLI;
measuring, based at least in part on the one or more parameters, one or more measurements of signals received on the resources indicated by the resource setting at least one component carrier of the multiple component carriers; and
reporting, based on the configuration and measuring the signals, the one or more measurements to the base station.

2. The method of claim 1, wherein the one or more parameters indicated in the configuration include at least one of a received signal strength indicator (RSSI) or a reference signal received power (RSRP).

3. The method of claim 1, wherein the resource setting indicates the resources as including at least one of non-zero power resource of one or more nodes over which to measure signals received from the one or more nodes and at least one zero power resource over which to measure reference signals from the one or more nodes, and
wherein measuring the one or more measurements includes at least one of measuring an inter-cell CLI measurement over the at least one zero power resource or measuring an intra-cell CLI measurement over the at least one non-zero power resource.

4. The method of claim 3, wherein the configuration includes an indicator indicating whether a resource in the resources is utilized for inter-cell or intra-cell measurements.

5. The method of claim 1, wherein the one or more parameters include an indication of time and frequency resources for measuring the signals.

6. The method of claim 1, wherein the resource setting indicates the resources as including non-zero power resources of one or more nodes over which to measure signals, wherein the resource setting indicates resources of a sounding reference signal or an uplink demodulation reference signal, and wherein the one or more parameters indicated in the configuration include at least one of a received signal strength indicator (RSSI) or a reference signal received power (RSRP).

7. The method of claim 1, wherein the resource setting indicates the resources as including zero power resources of one or more nodes over which to measure reference signals, wherein the resource setting indicates resources of a channel state information reference signal (CSI-RS) for channel state information interference measurement (CSI-IM), and wherein the one or more parameters indicated in the configuration include a received signal strength indicator (RSSI).

8. The method of claim 1, further comprising receiving, from a base station, a capability indicator indicating a maximum number of CLI reports supported, wherein the configuration is based on the maximum number of CLI reports supported.

9. The method of claim 8, wherein the capability indicator is band specific or band combination specific.

10. The method of claim 1, further comprising receiving, from a base station, a capability indicator indicating a maximum number of CLI resources supported or a maximum number of CLI resources that can be concurrently processed, wherein the configuration is based on the maximum number of CLI resources supported or the maximum number of CLI resources that can be concurrently processed.

11. The method of claim 10, wherein the capability indicator is band specific or band combination specific.

12. The method of claim 1, wherein receiving the configuration includes receiving, from the base station, the configuration as part of a channel state information (CSI) reporting configuration based on at least one of indicating CLI measurement resources as related to sounding reference signal (SRS) resources or a CLI report quantity identifier corresponding to a specific resource set.

13. The method of claim 12, further comprising determining, based on whether the CSI reporting configuration indicates an aperiodic, semi-persistent, or periodic CSI report, a priority for CLI measurement reporting based on the configuration.

14. The method of claim 12, further comprising determining, based on whether the CSI reporting configuration indicates CLI measurement, a priority for a CSI report.

15. The method of claim 12, wherein measuring the one or more measurements of signals includes assigning a CSI processing unit (CPU) for each of a number of zero power or non-zero power resources indicated in the configuration.

16. The method of claim 15, wherein assigning the CPU includes at least one of:
 assigning the CPU such that, for periodic or semi-persistent CSI reports indicated in CSI reporting configuration, the CPU is occupied from an earliest one of each of zero power and non- zero power resources until a last symbol related to the reporting; or
 assigning the CPU such that, for an aperiodic CSI report indicated in CSI reporting configuration, the CPU is occupied from a first symbol after triggering the aperiodic CSI report until a last symbol related to the reporting.

17. A method for wireless communications, comprising:
transmitting, to a user equipment (UE), a configuration for cross-link interference (CLI) measurement reporting, wherein the configuration indicates, for each component carrier of multiple component carriers:
 an identifier of the component carrier;
 one or more parameters for measuring signals related to CLI on the component carrier; and
 a resource setting indicating resources of the component carrier over which to measure the signals related to CLI;
receiving, from the UE and based at least in part on the one or more parameters, one or more measurements of signals received on the resources indicated by the resource setting for at least one component carrier of the multiple component carriers.

18. The method of claim 17, wherein the one or more parameters indicated in the configuration include at least one of a received signal strength indicator (RSSI) or a reference signal received power (RSRP).

19. The method of claim 17, wherein the resource setting indicates the resources as including at least one of non-zero power resource of one or more nodes over which to measure signals received from the one or more nodes and at least one zero power resource over which to measure reference signals from the one or more nodes.

20. The method of claim 19, further comprising instructing the one or more nodes to transmit one or more reference signals during the at least one zero power resource.

21. The method of claim 17, wherein the configuration includes an indicator indicating whether a resource in the resources is utilized for inter-cell or intra-cell measurements.

22. The method of claim 17, wherein the one or more parameters include an indication of time and frequency resources for measuring the signals.

23. The method of claim 17, wherein the resource setting indicates the resources as including non-zero power resources of one or more nodes over which to measure signals, wherein the resource setting indicates resources of a sounding reference signal or an uplink demodulation reference signal, and wherein the one or more parameters indicated in the configuration include at least one of a received signal strength indicator (RSSI) or a reference signal received power (RSRP).

24. The method of claim 17, wherein the resource setting indicates the resources as including zero power resources of one or more nodes over which to measure reference signals, wherein the resource setting indicates resources of a channel state information reference signal (CSI-RS) for channel state information interference measurement (CSI-IM), and wherein the one or more parameters indicated in the configuration include a received signal strength indicator (RSSI).

25. The method of claim 17, further comprising transmitting, to the UE, a capability indicator indicating at least one of:
- a maximum number of CLI reports supported, wherein the configuration is based on the maximum number of CLI reports supported; or
- a maximum number of CLI resources supported or a maximum number of CLI resources that can be concurrently processed, wherein the configuration is based on the maximum number of CLI resources supported or the maximum number of CLI resources that can be concurrently processed.

26. The method of claim 17, wherein transmitting the configuration includes transmitting the configuration as part of a channel state information (CSI) reporting configuration based on at least one of indicating CLI measurement resources as related to sounding reference signal (SRS) resources or indicating CLI measurement resources based on a CLI report quantity identifier corresponding to a specific resource set.

27. An apparatus for wireless communication, comprising:
a transceiver;
a memory configured to store instructions; and
one or more processors communicatively coupled with the memory and the transceiver, wherein the one or more processors are configured to:
receive, from a base station, a configuration for cross-link interference (CLI) measurement reporting, wherein the configuration indicates, for each component carrier of multiple component carriers:
an identifier of the component carrier;
one or more parameters for measuring signals related to CLI on the component carrier; and
a resource setting indicating resources of the component carrier over which to measure the signals related to CLI;
measure, based at least in part on the one or more parameters, one or more measurements of signals received on the resources indicated by the resource setting for at least one component carrier of the multiple component carriers; and
report, based on the configuration and measuring the signals, the one or more measurements to the base station.

28. The apparatus of claim 27, wherein the one or more parameters indicated in the configuration include at least one of a received signal strength indicator (RSSI) or a reference signal received power (RSRP).

29. An apparatus for wireless communication, comprising:
a transceiver;
a memory configured to store instructions; and
one or more processors communicatively coupled with the memory and the transceiver, wherein the one or more processors are configured to:
transmit, to a user equipment (UE), a configuration for cross-link interference (CLI) measurement reporting, wherein the configuration indicates, for each component carrier of multiple component carriers:
an identifier of the component carrier;
one or more parameters for measuring signals related to CLI on the component carrier; and
a resource setting indicating resources of the component carrier over which to measure the signals related to CLI;
receive, from the UE and based at least in part on the one or more parameters, one or more measurements of signals received on the resources indicated by the resource setting for at least one component carrier of the multiple component carriers.

30. The apparatus of claim 29, wherein the one or more parameters indicated in the configuration include at least one of a received signal strength indicator (RSSI) or a reference signal received power (RSRP).

* * * * *